United States Patent
Sawyers et al.

(10) Patent No.: US 7,689,851 B2
(45) Date of Patent: Mar. 30, 2010

(54) LIMITING POWER STATE CHANGES TO A PROCESSOR OF A COMPUTER DEVICE

(75) Inventors: Thomas P. Sawyers, Hempstead, TX (US); Dallas M. Barlow, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 692 days.

(21) Appl. No.: 11/588,918

(22) Filed: Oct. 27, 2006

(65) Prior Publication Data

US 2008/0104436 A1    May 1, 2008

(51) Int. Cl.
    *G06F 1/26* (2006.01)
(52) U.S. Cl. ........................ 713/323; 713/320
(58) Field of Classification Search .......... 713/323
    See application file for complete search history.

(56) References Cited

U.S. PATENT DOCUMENTS

| | | | |
|---|---|---|---|
| 5,387,857 A | 2/1995 | Honda et al. | |
| 5,422,558 A | 6/1995 | Stewart | |
| 5,511,203 A * | 4/1996 | Wisor et al. ................. | 713/322 |
| 5,734,254 A | 3/1998 | Stephens | |
| 6,018,229 A | 1/2000 | Mitchell et al. | |
| 6,211,648 B1 | 4/2001 | Chew | |
| 6,224,996 B1 | 5/2001 | Bovio et al. | |
| 6,367,023 B2 * | 4/2002 | Kling et al. .................. | 713/340 |
| 6,472,848 B2 * | 10/2002 | Stryker et al. ................ | 320/135 |
| 6,574,740 B1 * | 6/2003 | Odaohhara et al. .......... | 713/323 |
| 6,845,456 B1 * | 1/2005 | Menezes et al. ............. | 713/320 |
| 6,983,212 B2 | 1/2006 | Burns | |
| 7,017,061 B2 * | 3/2006 | Lippert et al. ................ | 713/324 |
| 7,178,043 B2 * | 2/2007 | Nakazato ..................... | 713/300 |
| 2001/0044909 A1 | 11/2001 | Oh et al. | |
| 2002/0083354 A1 | 6/2002 | Adachi | |
| 2002/0108070 A1 * | 8/2002 | Oh .............................. | 713/600 |
| 2004/0064745 A1 | 4/2004 | Kadambi | |
| 2004/0088590 A1 | 5/2004 | Lee et al. | |
| 2004/0133816 A1 | 7/2004 | Miyairi et al. | |
| 2006/0161794 A1 * | 7/2006 | Chiasson et al. ............ | 713/300 |

OTHER PUBLICATIONS

International Search Report with Written Opinion dated Jul. 4, 2008.
EP Office Action dated Aug. 25, 2009, pp. 2.

* cited by examiner

*Primary Examiner*—Nitin C Patel

(57) ABSTRACT

One embodiment is a computer device that uses a timer to limit a quantity of changes to different power states that are performed on a processor in the computer device during a predetermined time period. The power states changes each have different operating frequencies for the processor.

22 Claims, 3 Drawing Sheets

LIMITING POWER STATE CHANGES TO A PROCESSOR OF A COMPUTER DEVICE

BACKGROUND

Computer devices are generally configured to be powered by a battery and/or an alternating current (AC) adapter. A battery and/or AC adapter is rated to supply a particular level of power before a current limit is reached. If the current limit is approached and/or reached, a processor of the computer device is throttled to reduce the amount of current drawn from the power source. However, throttling of the processor adversely affects the performance of the computer device. Additionally, throttling the processor results in limited power savings (e.g., although throttling results in a lower operating frequency of the processor and some power savings, the operating voltage level of the processor may still be at a maximum level).

BRIEF DESCRIPTION OF THE DRAWINGS

For a more complete understanding of the present invention and the advantages thereof, reference is now made to the following descriptions taken in connection with the accompanying drawings in which.

DETAILED DESCRIPTION OF THE DRAWINGS

The preferred embodiments of the present invention and the advantages thereof are best understood by referring to FIGS. 1-4 of the drawings, like numerals being used for like and corresponding parts of the various drawings.

Figure 1:
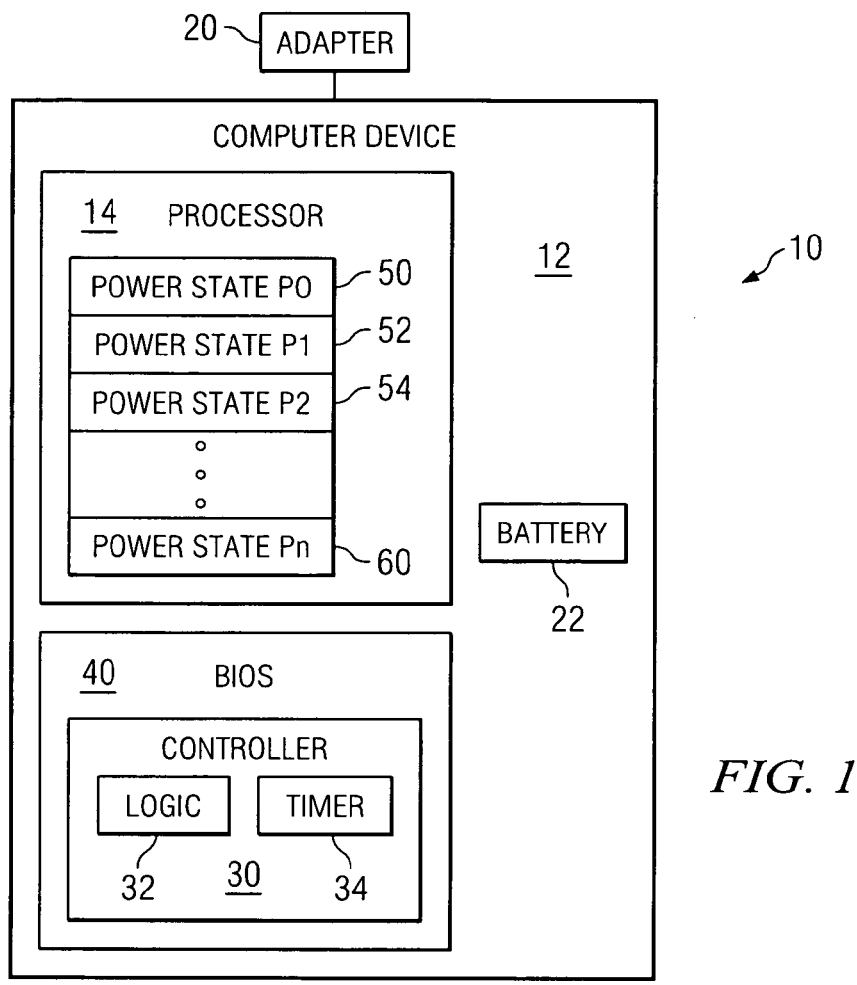
FIG. 1 is a diagram illustrating an embodiment of a computer device power management system.

FIG. 1 is a diagram illustrating an embodiment of a computer device power management system 10. In the embodiment illustrated in FIG. 1, system 10 is implemented in a computer device 12. Computer device 12 may comprise any type of computing device having a processor 14 such as, but not limited to, a notebook or laptop computer, personal digital assistant, tablet computer, or other type of portable or non-portable electronic device. In the embodiment illustrated in FIG. 1, computer device 12 is configured to be powered by an alternating current (AC) adapter 20 and/or a battery 22. In FIG. 1, battery 22 is illustrated as being an internal battery. However, it should be understood that battery 22 may also comprise an external battery. Processor 14 may comprise a general processing platform or a processing platform associated with a graphics generator/system or other type of function.

In the embodiment illustrated in FIG. 1, system 10 comprises a controller 30 for managing and/or otherwise controlling a power draw by computer device 12 from adapter 20 and/or battery 22. Controller 30 may comprise hardware, software, firmware or a combination thereof. For example, in the embodiment illustrated in FIG. 1, controller 30 comprises logic 32 which may be an ordered listing of executable instructions that can be embodied in any computer-readable medium for use by or in connection with an instruction execution system, apparatus, or device, such as a computer-based system, processor containing system, or other system that can fetch the instructions from the instruction execution system, apparatus, or device, and execute the instructions. In the context of this document, a "computer-readable medium" can be any means that can contain, store, communicate, propagate or transport the program for use by or in connection with the instruction execution system, apparatus, or device. The computer-readable medium can be, for example, but is not limited to, an electronic, magnetic, optical, electromagnetic, infrared, or semi-conductor system, apparatus, device, or propagation medium. In the embodiment illustrated in FIG. 1, controller 30 is illustrated as being disposed within a basic input/output system (BIOS) 40. However, it should be understood that controller 30 may be otherwise stored and/or located.

In FIG. 1, processor 14 is configured having a plurality of different power states such that each power state comprises a different predetermined operating frequency for processor 14. For example, in the embodiment illustrated in FIG. 1, processor 14 is configured having a power state P0 (indicated by 50), a power state P1 (indicated by 52), a power state P2 (indicated by 54), through a power state Pn (indicated by 60). In this example, power state P0 represents an operating frequency of processor 14 at its maximum or normal operating frequency, and each of power states P1-Pn represents an incrementally decreasing and predetermined operating frequency of processor 14 (e.g., power state P1 having an operating frequency less than P0, power state P2 having an operating frequency less than P1, etc.). However, it should be understood that the power states of processor 14 may be otherwise identified and/or ordered (e.g., power state P0 representing the lowest power state and Pn representing the highest power state). In FIG. 1, controller 30 also comprises a timer 34 (e.g., an internal timer preferably implemented in firmware). Timer 34 is used to limit a quantity of power state changes performed on processor 14 during a predetermined time period, thereby preventing power state changes from occurring too often (which would detrimentally affect processor 14 performance and cause overly-frequent processing interruptions). Thus, for example, in some embodiments, timer 34 is used to limit a quantity of power state changes of processor 14 to one per second; however, it should be understood that other timing scenarios may be used.

In operation, controller 30 monitors the amount of current drawn from adapter 20 and/or battery 22 and throttles processor 14 (e.g., while within a particular power state) to prevent adapter 20 and/or battery 22 from reaching their respective rated current limit. For example, an overcurrent condition is generally defined when computer device 12 tries to draw a level of current from adapter 20 and/or battery 22 that approaches and/or otherwise reaches their respective rated current limit. Adapter 20 and/or battery 22 is configured to generate and/or otherwise transmit an analog current limit signal indicating the overcurrent condition. The analog current signal received by controller 30 from adapter 20 and/or battery 22 is used to generate an overcurrent protection (OCP) signal which is used to throttle processor 14. For example, the OCP signal is generally a pulse-width-modulated (PWM) signal with a fixed amplitude (e.g., 3.3 volts). As used herein, to "throttle" or "throttling" of processor 14 means that the operating speed or frequency of processor 14 is throttled by periodically stopping the clock of processor 14 for a desired percentage of time, thereby reducing the effective speed or frequency of processor 14 and, correspondingly, the amount of power drawn from adapter 20 and/or battery 22.

In addition to throttling of processor 14, controller 30 is configured to automatically and/or dynamically adjust a power state of processor 14 based on a level of throttling of processor 14. For example, embodiments of system 10 monitor a level of throttling of processor 14 to determine when a decrement or increment to a power state of processor 14 should be performed. Thus, for example, if the level of throttling of processor 14 increases beyond a predetermined threshold, controller 30 automatically decrements the power state of processor 14, thereby resulting in a reduced power draw from adapter 20 and/or battery 22. Correspondingly, as the load on adapter 20 and/or battery 22 decreases and the level of throttling of processor 14 decreases, controller 30 automatically increments the power state of processor 14. Generally, a decrease in the power state of processor 14 results in a decrease in the voltage used to power processor 14, thereby resulting in a significant savings in power drawn from adapter 20 and/or battery 22.

Figure 2:
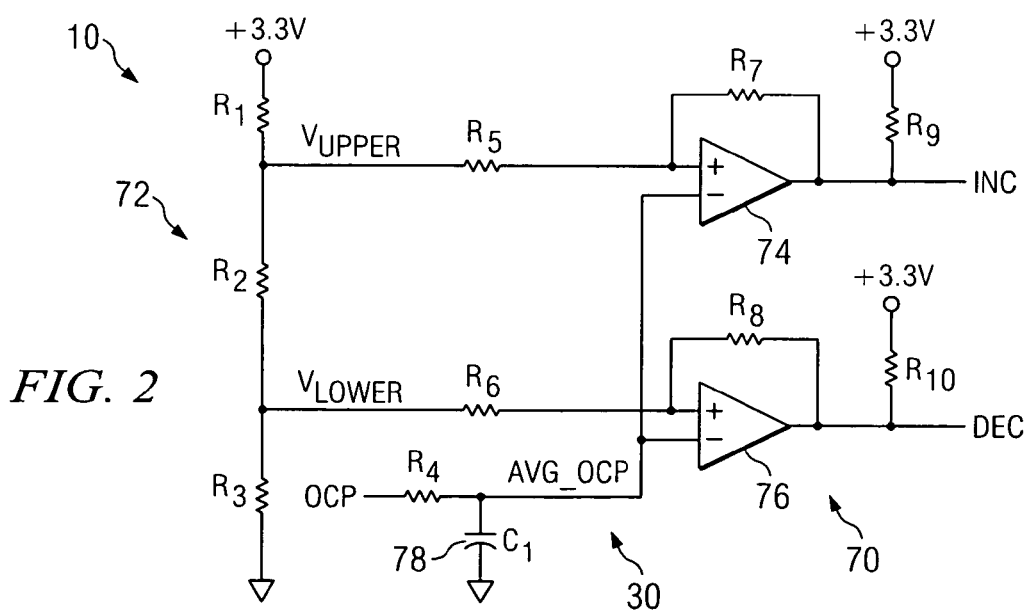
FIG. 2 is a diagram illustrating an embodiment of a controller circuit of a power management system.

FIG. 2 is a diagram illustrating an embodiment of a controller circuit 70 of controller 30. In the embodiment illustrated in FIG. 2, circuit 70 comprises resistors $R_1$, $R_2$, and $R_3$ forming a divider 72 for inputting two different reference voltages, indicated by $V_{UPPER}$ and $V_{LOWER}$, to comparators 74 and 76, respectively. Further, circuit 70 comprises a low pass filter 78 comprising a resistor $R_4$ and a capacitor C, for generating an averaged OCP signal (identified as AVG_OCP) from the OCP signal. The AVG_OCP signal is indicative of the averaged level of throttling of processor 14 (FIG. 1). In the embodiment illustrated in FIG. 2, circuit 70 also comprises resistors $R_5$ and $R_6$ coupled to inputs to comparators 74 and 76, respectively, resistors $R_7$ and $R_8$ coupled across comparators 74 and 76, respectively, and resistors $R_9$ and $R_{10}$ coupled between respective outputs of comparators 74 and 76 and a logic level voltage (e.g., 3.3 volts). As illustrated in FIG. 2, the output of comparator 74 is defined as an increment signal (illustrated as "INC" in FIG. 2), and the output of comparator 76 is defined as a decrement signal (illustrated as "DEC" in FIG. 2).

In operation, the outputs of comparators 74 and 76 are used to determine whether to increment or decrement the power state of processor 14 (FIG. 1) based on the level of throttling of processor 14 as indicated by the average OCP signal. The operation of circuit 70 will be better understood by referring to FIG. 3 which is an exemplary embodiment of a timing diagram based on signals associated with circuit 70 illustrated in FIG. 2. In the embodiment illustrated in FIG. 3, the timing diagram indicates the state of the OCP signal (e.g., either 0 volts or 3.3 volts), the voltage level of the AVG_OCP signal (e.g., between 0 volts and 3.3 volts), the state of the increment (INC) and decrement (DEC) signals, the power state of processor 14, and internal timer 34 of controller 30.

Figure 3:
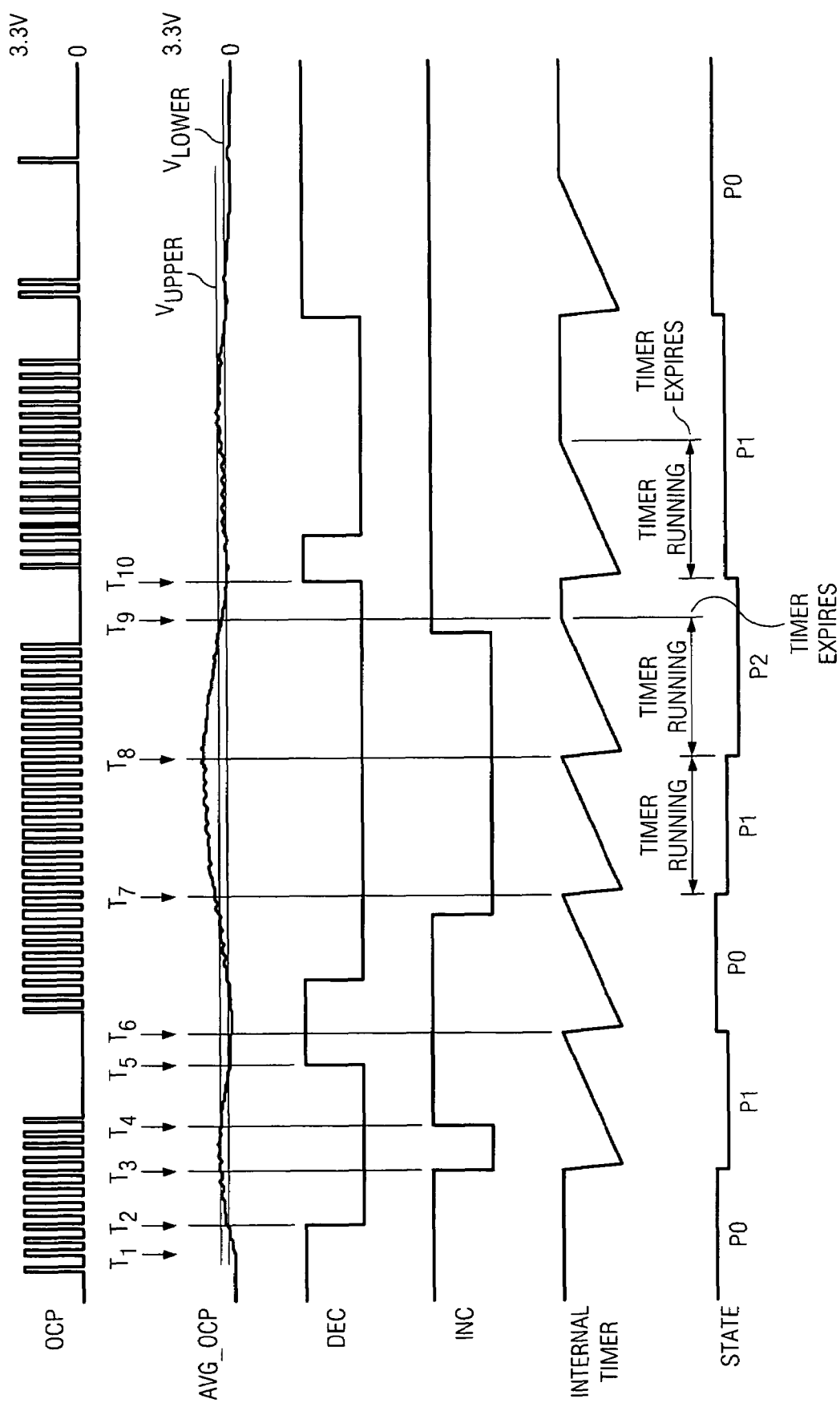
FIG. 3 is an exemplary timing diagram based on signals associated with the controller circuit of FIG. 2.

Referring to FIGS. 2 and 3, the output of comparator 74 (the increment signal) is HI whenever the averaged OCP signal (AVG_OCP) is below a fixed threshold ($V_{UPPER}$) and is LO whenever the averaged OCP signal (AVG_OCP) is above a fixed threshold ($V_{UPPER}$). Further, the output of comparator 76 (the decrement signal) is HI whenever the averaged OCP signal (AVG_OCP) is below a fixed voltage threshold ($V_{LOWER}$) and LO whenever the averaged OCP signal (AVG_OCP) is above a fixed voltage threshold ($V_{LOWER}$). Thus, referring to FIG. 3 at or around timing position $T_1$, the OCP signal indicates that processor 14 (FIG. 1) is being throttled; as a result, the averaged OCP signal (AVG_OCP) begins to increase from approximately zero volts, indicating an increasing level of throttling of processor 14. As illustrated in FIG. 3, the increment and decrement signals are both in a HI state at timing position $T_1$. because the AVG_OCP signal is lower than both the $V_{UPPER}$ and $V_{LOWER}$ thresholds.

At timing position $T_2$, the AVG_OCP signal increases above $V_{LOWER}$, thereby indicating an increasing level of throttling of processor 14 (FIG. 1) and resulting in the decrement signal being LO. As the level of throttling of processor 14 increases, at timing position $T_3$, the AVG_OCP signal increases above $V_{UPPER}$, thereby resulting in increment signal being LO. In response to both increment and decrement signals being LO, controller 30 and/or BIOS 40 causes a decrement in the power state of processor 14 from state P0 to state P1. Thus, in the P1 power state, the operating frequency of processor 14 and the voltage used to power processor 14 are reduced, as well as the current drawn from adapter 20 and/or battery 22.

At timing position $T_4$, the level of throttling has decreased such that the AVG_OCP signal is lower than $V_{UPPER}$, thereby resulting in the increment signal being HI. At timing position $T_5$, a further reduction in the amount of throttling of processor 14 results in the AVG_OCP signal decreasing to below $V_{LOWER}$, thereby resulting in the decrement signal being HI. In the embodiment illustrated in FIG. 3, the internal timer (e.g., timer 34 of FIG. 1) is used to determine whether to increment or decrement the power state of processor 14. For example, in some embodiments, at each increment/decrement of a power state of processor 14, the internal timer 34 is initiated. After internal timer 34 expires, the increment and decrement signals are evaluated. Thus, after internal timer 34 expires, if the increment and decrement signals are both HI, processor 14 is incremented, and if the increment and decrement signals are both LO, processor 14 is decremented. However, if the increment signal is HI but the decrement signal is LO after internal timer 34 expires, no incrementing/decrementing of processor 14 is performed until such time that both the increment and decrement signals are either both HI or both LO. Thus, referring to FIG. 3, at timing position $T_3$, internal timer 34 is initialized. At timing position $T_5$, although both the increment and decrement signals are HI, internal timer 34 has not yet expired, so processor 14 is not yet incremented. At timing position $T_6$, internal timer 34 expires and, because the increment and decrement signals are both HI, controller 30 and/or BIOS 40 causes an increment of the power state of processor 14 from state P1 to state P0.

At timing position $T_7$, timer 34 expires while the increment and decrement signals are both LO, resulting in a transition of the power state of processor 14 from P0 to P1. At timing position $T_8$, internal timer 34 expires and the increment and decrement signals are again evaluated. At timing position $T_8$, because both the increment and decrement signals remain LO (e.g., because the AVG_OCP signal remains above both $V_{LOWER}$ and $V_{UPPER}$), controller 30 and/or BIOS 40 causes another decrement in the power state of processor 14 from power state P1 to power state P2. It should be understood that if the AVG_OCP signal remains below both $V_{LOWER}$ and $V_{UPPER}$ for additional timer 34 periods (e.g., both the increment and decrement signals remaining LO), the power state of processor 14 is incrementally decremented after each timer period until the lowest power state is reached.

At timing position $T_9$, timer 34 expires. However, because the increment signal is HI and the decrement signal is LO, no incrementing/decrementing of processor 14 is performed until, as indicated at timing position $T_{10}$, both the increment and decrement signals are HI, at which time processor 14 is incremented from power state P2 to power state P1 and timer 34 is again initialized. It should also be understood that if the AVG_OCP signal remains below both $V_{UPPER}$ and $V_{LOWER}$ for additional timer 34 periods (e.g., both the increment and decrement signals remaining HI), the power state of processor 14 is incrementally incremented after each time period until P0 is reached. Accordingly, if the AVG_OCP signal remains between the $V_{UPPER}$ and $V_{LOWER}$ thresholds (e.g., the increment signal being HI and the decrement signal being LO), the power state of processor 14 remains unchanged.

In the embodiment illustrated in FIGS. 1 and 2, throttling and adjustment of a power state of a single processor is described. However, it should be understood that the above-described system 10 and method may be used on multiple processing platforms. For example, throttling and power-state shifting may be performed in a graphics memory processor, a graphics engine processor, or other processing platform together or separately. Further, in the embodiment illustrated in FIG. 2, circuit 30 is configured to output two signals (i.e., the increment and decrement signals). However, it should be understood that circuit 30 may be otherwise configured (e.g., to output a single signal for either incrementing or decrementing the power state of a processor). Further, it should be understood that the function(s) of circuit 30 may be performed entirely or at least partially by software/firmware.

Figure 4:
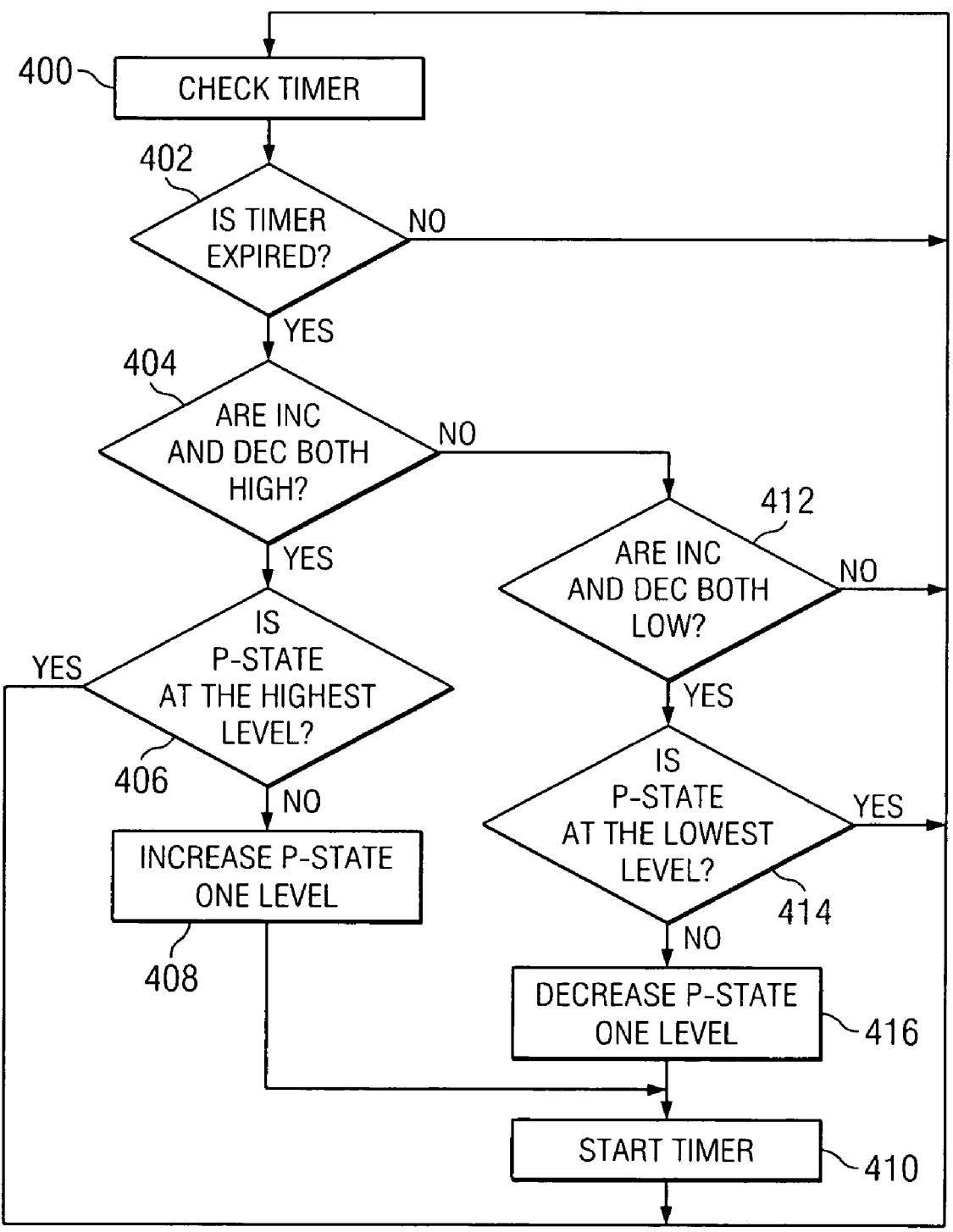
FIG. 4 is a flow diagram illustrating an embodiment of a computer device power management method.

FIG. 4 is a flow diagram illustrating an embodiment of a computer device power management method. The method begins at block 400, where timer 34 is checked. At decision block 402, a determination is made whether timer 34 has expired. If timer 34 has expired, the method proceeds to decision block 404, where a determination is made whether the increment and decrement signals are both HI. If the increment and decrement signals are both HI, the method proceeds to decision block 406, where a determination is made whether the power state of processor 14 is at its highest available level (e.g., P0). If the power state of processor 14 is not yet at its highest level, the method proceeds to block 408 where the power state of processor 14 is incremented by one state or level (e.g., from P2 to P1). The method proceeds to block 410 where timer 34 is initialized and/or otherwise started. If at decision block 406 it is determined that the power state of processor 14 is at its highest level, no power state adjustment is performed on processor 14 and the method proceeds to block 400 where timer 34 is again checked and/or monitored.

If at decision block 404 it is determined that the increment and decrement signals are not both HI, the method proceeds to decision block 412, where it is determined whether the increment and decrement signals are both LO. If the increment and decrement signals are not both LO, no power state adjustment is performed on processor 14 and the method proceeds to block 400 where timer 34 is again checked and/or monitored. If at decision block 412 it is determined that the increment and decrement signals are both LO, the method proceeds to decision block 414, where it is determined whether processor 14 is at its lowest available power state. If processor 14 is at its lowest available power state, no power state adjustment is performed on processor 14 and the method proceeds to block 400 where timer 34 is again checked and/or monitored. If at decision block 414 it is determined that processor 14 is not yet at its lowest available power state, the method proceeds to block 416, where the power state of processor 14 is decremented by one state or level (e.g., from P1 to P2). The method proceeds to block 410 where timer 34 is initialized and/or otherwise started.

Thus, in operation, based on the level of throttling of processor 14 as indicated by the averaged OCP signal (as also indicated by the HI or LO conditions of increment and decrement signals output by comparator 74 and 76), the power state of processor 14 is incremented or decremented one or more levels to control a power draw of computer device 12. Accordingly, embodiments of system 10 provide for variable processor control using both throttling and power state adjustments to control a power draw from adapter 20 and/or battery 22. It should be understood that in the described method, certain functions may be omitted, accomplished in a sequence different from that depicted in FIG. 4, or simultaneously performed. Also, it should be understood that the method depicted in FIG. 4 may be altered to encompass any of the other features or aspects of the invention as described elsewhere in the specification. Further, embodiments may be implemented in software and can be adapted to run on different platforms and operating systems.

What is claimed is:

1. A computer device power management system, comprising:
    a controller that throttles a processor of a computer device responsive to an overcurrent condition associated with a power source powering the computer device, the controller adjusts a power state of the processor to at least one of a plurality of predetermined power states based on a level of the throttle; and
    a timer that limits a quantity of changes to the power states that are performed on the processor during a predetermined time period to limit processing interruptions to the processor.

2. The system of claim 1, wherein each of the predetermined power states comprises a different predetermined operating frequency for the processor.

3. The system of claim 1, wherein the controller limits a quantity of power state transitions of the processor during the predetermined time period.

4. The system of claim 1, wherein the controller generates an averaged overcurrent protection signal indicative of the level of the throttle.

5. The system of claim 4, wherein the controller decrements the processor to at least one of the plurality of predetermined power states if the averaged overcurrent protection signal increases above a predetermined threshold.

6. The system of claim 1, wherein the controller increments the processor to at least one of the plurality of predetermined power states in response to a decreased level of the throttle.

7. The system of claim 1, wherein the controller adjusts the power state after expiration of a timer.

8. The system of claim 1, wherein the timer limits the quantity of changes to the power states to prevent processing interruptions that detrimentally affect performance of the processor.

9. The system of claim 1, wherein the controller comprises a control circuit that generates an averaged overcurrent protection signal indicative of the level of the throttle.

10. A computer device power management method, comprising:
    throttling a processor of a computer device in response to an overcurrent condition associated with a power source powering the computer device;
    adjusting a power state of the processor to at least one of a plurality of predetermined power states based on a level of the throttle; and
    preventing processing interruptions to the processor by limiting a quantity of power state transitions the processor performs during a predetermined time period.

11. The method of claim 10, further comprising generating an averaged overcurrent protection signal indicative of the level of the throttle.

12. The method of claim 10, wherein each of the predetermined power states comprises a different predetermined operating frequency for the processor.

13. The method of claim 10, further comprising using a timer to determine when the processor changes to one of the plurality of predetermined power states.

14. The method of claim 10, wherein adjusting comprises decrementing the processor to at least one of the plurality of predetermined power states if an averaged overcurrent protection signal indicative of the level of the throttle exceeds a predetermined threshold.

15. The method of claim 10, wherein adjusting comprises incrementing the processor to at least one of the plurality of predetermined power states in response to a decreased level of the throttle.

16. The method of claim 10, wherein adjusting comprises adjusting the power state of the processor after expiration of a timer.

17. A computer device power management system, comprising:
   means for throttling a processor means of a computer means in response to an overcurrent condition associated with a power means powering the computer means;
   means for adjusting a power state of the processor means to at least one of a plurality of predetermined power states based on a level of the throttling; and
   means for preventing interruptions to the processor means by limiting a quantity of changes to the predetermined power states that are performed on the processor means during a predetermined time period.

18. The system of claim 17, further comprising means for generating an averaged overcurrent protection signal indicative of the level of the throttling.

19. The system of claim 17, wherein the adjusting means comprises means for decrementing the processor means to at least one of the plurality of predetermined power states if the level of the throttling increases beyond a predetermined threshold.

20. The system of claim 17, wherein the adjusting means comprises means for incrementing the processor means to at least one of the plurality of predetermined power states in response to a decreased level of the throttling.

21. The system of claim 17, wherein the means for preventing interruptions to the processor means limits the quantity of changes to the predetermined power states to prevent processing interruptions that detrimentally affect performance of the processor means.

22. A computer storing executable instructions that are executed by a processor in the computer to perform a method, comprising:
   throttling of a processor of a computer device responsive to an overcurrent condition associated with a power source powering the computer device, the controller adjusts a power state of the processor to at least one of a plurality of predetermined power states based on a level of the throttle; and
   using a timer to prevent processing interruptions to the processor by limiting a quantity of transitions to the predetermined power states that the processor performs during a predetermined time period.

* * * * *